United States Patent [19]

Wieske et al.

[11] Patent Number: 4,702,928
[45] Date of Patent: Oct. 27, 1987

[54] PROCESS FOR PRODUCING FAT BLENDS FOR MARGARINE AND LOW-FAT SPREADS

[75] Inventors: Theophil Wieske; Klaus H. Todt, both of Hamburg, Fed. Rep. of Germany; Johan F. Kleibeuker, Leeuwarden, Netherlands

[73] Assignee: Internationale Octrooi Maatschappij "Octropa" B.V., Rotterdam, Netherlands

[21] Appl. No.: 811,080

[22] Filed: Dec. 18, 1985

[30] Foreign Application Priority Data

Dec. 19, 1984 [GB] United Kingdom ............... 84 32058

[51] Int. Cl.$^4$ .............................................. A23D 5/02
[52] U.S. Cl. .................................................. 426/607
[58] Field of Search ........................ 426/603, 604, 607

[56] References Cited

U.S. PATENT DOCUMENTS

| 3,949,105 | 4/1976 | Wieske et al. | 426/607 |
| 4,016,302 | 4/1977 | Kattenberg et al. | 426/607 |
| 4,055,679 | 10/1977 | Kattenberg et al. | 426/607 |
| 4,510,167 | 4/1985 | Schmidt et al. | 426/607 |
| 4,567,056 | 1/1986 | Schmidt | 426/607 |
| 4,590,087 | 5/1986 | Pronk et al. | 426/607 X |

*Primary Examiner*—Robert Yoncoskie
*Attorney, Agent, or Firm*—Cushman, Darby & Cushman

[57] ABSTRACT

Edible fat blend having properties reminiscent of dairy butter is produced from a fat (a) rich in triglycerides from trans-unsaturated fatty acids, a fat (b) rich in symmetrical SUS triglycerides, and a fat (c) rich in asymmetrical triglycerides SSU.

15 Claims, No Drawings

PROCESS FOR PRODUCING FAT BLENDS FOR MARGARINE AND LOW-FAT SPREADS

The present invention relates to an edible fat, to margarines and reduced-fat spreads containing said fat and to a process for producing said fat.

There is a need of margarines and reduced-fat spreads of the low calorie type which have a good consistency, which means a good spreadability, plasticity and toughness, which are stable under distribution conditions, under conditions prevailing in the refrigerator and on the table at home. It is further important that such products display a good melting behaviour on consumption, which means that little or no waxiness is perceived, and good coolness properties, which means that the products melt quickly under the temperature and shear conditions prevailing in the mouth, giving an oral response similar to that perceived on consumption of dairy butter.

There is also a need of an economical process for producing fats which can be used in said margarines and reduced-fat spreads, which means that relatively cheap ingredients and simple operations should be used. In particular, the amount of fats to be fractionated should be kept at a minimum and the use of lauric fats should, if possible, be reduced to a minimum.

Applicants have found fat blends and a process for producing such which meet the above desiderata to a great extent.

The fat blends according to the invention have the following characteristics:
the level of $S_3$ triglycerides does not exceed 3%;
the sum of the levels of $S_3$ and $S_2E$ triglycerides ranges from 1 to 10%;
the level of $S_2U$ triglycerides ranges from 12 to 35%;
the level of $S_2M$ triglycerides ranges from 0 to 10%;
the sum of the levels of $S_3$, $S_2E$, $SE_2$, $S_2U$ and $S_2M$ triglycerides ranges from 25 to 60%;
the ratio of SUS to SSU triglycerides ranges from 0.6 to 2.0; and wherein
S is a saturated fatty acid having a chain length of 16 or more carbon atoms,
E is an unsaturated fatty acid in the transconfiguration with a chain length of 16 or more carbon atoms,
U is mono- or polyunsaturated fatty acid in the cis-configuration with a chain length of 18 or more carbon atoms, and
M is a saturated fatty acid with 12 or 14 carbon atoms, SUS being a symmetrical triglyceride and SSU being an asymmetrical triglyceride.

The fat blends may further comprise lower melting triglycerides such as $U_3$ and $SU_2$ triglycerides which are liquid at 10° C. and do not substantially contribute to the structure of the fat blend.

The fat blends of the present invention preferably display the following fat solids profile expressed in percentages of crystallized fat at the given temperatures, measured by nuclear magnetic resonance (NMR) as described in Fette, Seifen, Anstrichmittel, 80, 180–186 (1978):

$N_{10° C.}=25$–60%; $N_{20° C.}=12$–30%; $N_{35° C.}=0$–3%.

The perception of waxiness on consumption of edible spreads produced from the fat blends according to the invention is avoided owing to the low $N_{35}$ value.

The requirement regarding $N_{35}$ is met be ensuring that the level of triglycerides ($S_3$) from 3 saturated fatty acids containing 16 or more carbon atoms plus triglycerides ($S_2E$) from 2 saturated fatty acids containing 16 or more carbon atoms and 1 unsaturated fatty acid in the trans-configuration containing 16 or more carbon atoms, is kept at a minimum and particularly between 1 and 10%.

The level of fat solids at 20° C. is important for the stand-up properties, the plasticity, the storage stability and the coolness of the product.

The requirement regarding the $N_{20}$ value is mainly achieved by ensuring that the fat blend contains a relatively high level of triglycerides ($S_2U$) from 2 saturated fatty acids containing 16 or more carbon atoms and 1 mono-cis- or polyunsaturated fatty acid with 18 or more carbon atoms ranging from 12–35% (in view of their high solubility at 20° C. in oils), and particularly between 15% and 35%. The role of $S_2U$ triglycerides can partly be taken by $S_2M$ triglycerides. The level of $S_2M$ triglycerides will generally not exceed 10% and will preferably range from 0 to 7%.

For achieving butter-like consistency, the level of fat solids at 10° C. should preferably be higher than 30% (as high as acceptable), but should remain below 60%.

The requirement with respect to the $N_{10}$ value is met by ensuring that the sum of the levels of triglycerides ($S_3$) from 3 saturated $C_{16}$ or more fatty acids, triglycerides ($S_2E$) from 2 saturated $C_{16}$ or more fatty acids and 1 unsaturated trans-fatty acid, triglycerides ($SE_2$) from 1 saturated $C_{16}$ or more fatty acids and 2 trans-unsaturated fatty acids and triglycerides ($S_2U$) as hereinbefore defined ranges from 30 to 60%.

Applicants have further found that, in order to exploit the function of the $S_2U$ triglycerides in the best possible way, the ratio of symmetrical to asymmetrical $S_2U$ triglycerides should vary between 0.6 and 2.0, preferably between 0.8 and 1.8. Within this ratio the best possible combination of good stand-up property at 20° C. and good plasticity at about 10° C. are achieved.

The fat blends according to the invention can be used for producing edible emulsion spreads, particularly W/O emulsions of the margarine or reduced-fat spread type containing 20 to 70% fat, in a way known per se, using e.g. a Votator ® apparatus as described in Margarine, by Anderson & Williams, Second Revised Edition, 1965.

The present invention also relates to a process for producing the above-defined fat blends, which process comprises mixing
a fat (a) comprising $SE_2$ and $S_2E$ triglycerides,
a fat (b) comprising $S_2U$ triglycerides more than 60% of which consist of SUS triglycerides,
a fat (c) comprising $S_2U$ triglycerides more than 60% of which consist of SSU triglycerides, and optionally
a fat (d) having a melting point below 28° C.

Fat (a) comprises one or more hydrogenated fats which may be randomly interesterified. In this fat the ratio of the triglycerides SSE:SEE generally ranges from 1:3 to 3:1, and preferably from 1:2.5 to 2.5:1.

Fat (a) preferably constitutes 5–60% of the total fat blend.

Fat (a) is preferably selected such that it contains less than 20% $S_2U$ triglycerides. Fat (a) is, for instance, obtainable by random interesterification of a mixture of a liquid oil hydrogenated under conditions conducive to the formation of trans fatty acids, e.g. using a sulphur-poisoned nickel catalyst at relatively high temperatures (about 180° C.), and palm fat. The preferred ratio of hydrogenated oil to palm fat is about 80:20.

Random interesterification is carried out in a way known per se at 100° to 160° C. in the presence of a catalyst such as (0.2%) sodium or potassium glyceroxide as described in Anderson & Williams, Margarine, 1965, pages 56–56.

The liquid oil which is subjected to hydrogenation may consist of soybean oil, rapeseed oil, maize oil, sunflower oil, grapeseed oil, safflower oil, etc. Hydrogenation is usually carried out to a melting point ranging from 30° to 45° C. It is, of course, possible first to interesterify the liquid oil and the palm fat and subsequently to hydrogenate the interesterified mixture to the desired melting point.

Another example of a suitable component (a) consists of a palm olein fraction, e.g. obtained by dry fractionation of palm oil at a temperature between 24° and 38° C., separating the olein from the high-melting stearin and subsequently hydrogenating the palm olein to a level of trans preferably exceeding 30% and preferably ranging from 50 to 60%.

Still another example of component (a) may consist of a palm mid-fraction obtained by dry or wet fractionation and which is subsequently hydrogenated. Dry fractionation can be carried out, for instance, as described in EP No. 0078568.

Component (b) can be a mixture of symmetrical triglycerides or a natural mixture of triglycerides from e.g. palm oil, cottonseed oil, tallow, shea fat, cocoa butter or olein fractions thereof or mixtures of these oils and fats.

The olein fractions can be obtained by fractionation in the absence of a solvent (dry fractionation), in the presence of a solvent such as acetone or hexane or in the presence of an aqueous solution containing a detergent (Lanza fractionation). Preferably dry fractionation is applied, since it is cheaper and less complex.

For instance, palm oil can be fractionated at a temperature between 24° and 38° C. into a higher-melting fraction (stearin), which is separated, and into an olein fraction, which can be isolated and used as component (b) as such or mixed with e.g. a tallow olein, non-fractionated palm oil or cottonseed oil.

Component (b) can constitute 5 to 40% of the total fat blend.

Component (c) is obtainable, for instance, by interesterification of a mixture of non-hydrogenated triglycerides from saturated fatty acids with a chain length of 16 or more carbon atoms and cis-unsaturated fatty acids with a chain length of 16 or more carbon atoms, said saturated fatty acids constituting 25 to 55% of the total amount of fatty acids.

Said interesterified mixture may be fractionated, if necessary, to reduce the level of triglycerides ($S_3$) from 3 saturated $C_{16}$ or higher fatty acids to less than about 6%.

Component (c) is preferably substantially free from trans-fatty acids.

A suitable component (c) may include an olein obtained by randomly interesterifying palm oil and dry-fractionating the interesterified mixture to obtain the olein and a stearin which is discarded or used in subsequent interesterification batches with adjusted fatty acid composition.

Component (c) may comprise an interesterified mixture of one or more oils such as rapeseed oil, maize oil, sunflower oil, soybean oil, safflower oil, etc., part of which may be hydrogenated, such as soybean oil hydrogenated to a melting point of 60° C., palm fat hydrogenated to a melting point of 58° C. or a palm stearin.

To a mixture of components (a)+(b)+(c) up to 25% of a liquid oil or fat (e) having a melting point not exceeding 28° C. can be added. Examples of (e) may include laurics such as coconut fat, palmkernel fat, babassu fat, murmuru fat, ouricurum fat, etc. The use of such "lauric fats" is preferably limited to 0 to 10%, since at higher levels butter-likeness decreases. The rest of the added fat will then consist of an oil liquid at 20° C., such as sunflower oil or soybean oil.

A preferred process according to the present invention involves using a level of fractionated fat not exceeding 50%. This means that fats (b) and (c) or mixtures thereof when present as e.g. oleins are used in amounts lower than 50%, preferably lower than 40% and ideally in amounts which may range from 10 to 40%.

The invention will now be illustrated in the following examples. (In these examples and in the specification all percentages are by weight.)

EXAMPLE I

A fat blend was produced from 15% of fat component (a), 35% of fat component (b) and 50% of fat component (c).

Fat component (a) consisted of a hydrogenated olein. The olein was obtained by solventless fractionation of palm oil at 28° C., whereby a stearin was separated from a lower-melting olein fraction.

The olein obtained from the fractionation was subsequently hydrogenated at 180° C., using a sulphur-poisoned nickel catalyst, to a melting point of 41° C. The main characteristics of component (a) were as follows:

The level of unsaturated fatty acids in the trans-configuration was 36% (measured according to A.O.C.S. tentative method Cd 14–61).

The level of $S_3$ triglycerides was 4%.
The level of $S_2^*E$ triglycerides was 34%.
The level of $SE_2$ triglycerides was 15%.
(Analysis of triglycerides was carried out by HPLC.)

Fat component (b) consisted of an olein obtained by solventless fractionation of palm oil at 26° C., whereby a stearin was separated from the lower-melting olein fraction.

The main characteristics of the olein fraction were:
Level of $S_3$ triglycerides: 2%
Level of $S_2U$ triglycerides: 50%.
The ratio of symmetrical:asymmetrical triglycerides was 5:1.

Fat component (c) consisted of a mixture of triglycerides obtained by random interesterification of a mixture of 30% palm oil and 70% soybean oil. The main characteristics of component (c) were as follows:
Sum of levels of stearic and palmitic acid: 25%.
Level of $S_3$ triglycerides: 2%.
Level of $S_2U$ triglycerides: 16%.
The ratio of symmetrical:asymmetrical triglycerides was 1:2.

The main characteristics of the total fat blend were:
$S_3 + S_2E$ content: 7.5%.
$S_2U$ content: 28%.
$S_2E/SE_2$ ratio: 2.5 ($S_2E = 5.1\%$, $SE_2 = 1.95\%$).
Ratio of symmetrical:asymmetrical triglycerides: 1.8.
The fat solids profile of the fat blend (measured by nuclear magnetic resonance according to J.A.O.C.S. 1971, (48), p. 7, A. J. Haighton et al.) was as follows:
$N_{10° C.} = 37$; $N_{20° C.} = 17$; $N_{35° C.} = 1$.

A margarine was produced by emulsifying an aqueous phase (16%) in the above fat blend (84%) and by working and cooling the emulsion, using surface-scraped coolers and resting tubes (Votator ® apparatus).

The margarine displayed the following hardness values measured according to Haighton et al. J.A.O.C.S. 36 (1959), pages 345-348:
$C_{5°\ C.} = 1100\ g./cm^2$; $C_{10°\ C.} = 500\ g/cm^2$;
$C_{15°\ C.} = 300\ g/cm^2$; $C_{20°\ C.} = 200\ g/cm^2$.

This margarine was presented to a panel of experts, who judged its quality in comparison with dairy butter.

The margarine did not display waxiness and had an excellent coolness. The oral response and spreadability were very similar to those of dairy butter.

EXAMPLE II

A fat blend was produced from 20% of component (a), 30% of component (b) and 50% of component (c). (a, b and c are the same components as described in Example I.)

The main characteristics of the fat blend were as follows:
$S_3 + S_2E$ content: 9%.
$S_2U$ content: 25%.
Ratio asymmetrical:symmetrical triglycerides: 1.7.
Fat solids profile:
$N_{10°\ C.} = 40$; $N_{20°\ C.} = 18$; $N_{35°\ C.} = 1$.

A margarine produced according to Example I displayed the following hardness values (in $g/cm^2$):
$C_{5°\ C.} = 1100$; $C_{10°\ C.} = 500$; $C_{15°\ C.} = 450$; $C_{20°\ C.} = 140$.

The panel results were similar to those of Example I.

EXAMPLE III

A fat blend was produced from 20% of component (a), 20% of component (b) and 60% of component (c). The main characteristics of the fat blend were as follows:
$S_3 + S_2E = 8.5$;
$S_2U = 21\%$;
$S_2E/SE_2 = 2.5\%$.
Ratio of symmetrical:asymmetrical triglycerides: 1.6.
The fat solids profile was as follows:
$N_{10°\ C.} = 37$; $N_{20°\ C.} = 16$; $N_{35°\ C.} = 0$.

A margarine was produced according to Example I. The margarine had the following hardness values:
$C_{10°\ C.} = 800\ g/cm^2$; $C_{15°\ C.} = 500\ g/cm^2$;
$C_{20°\ C.} = 110\ g/cm^2$.

The panel results were similar to those of Example I.

EXAMPLE IV

A fat blend was produced by mixing
(i) 20% of fat (a) consisting of cottonseed oil hydrogenated under trans-promoting conditions (sulphur-poisoned nickel catalyst/180° C.) to a melting point of 36° C.;
(ii) 10% of fat (b) consisting of a palm olein obtained by fractionation of palm oil at 26° C. and separation of the olein from the higher-melting stearin; and
(iii) 70% of fat (c) consisting of a randomly interesterified mixture of 70% soybean oil and 30% palm oil.

The main characteristics of the total fat blend were:
$S_3 = 2\%$
$S_2E = 5\%$
$SE_2 = 5\%$
$S_2U = 18\%$
Ratio SUS:SSU = 1.3.

The fat solids profile of the fat blend was (Measured by NMR):
$N_{10} = 36$; $N_{20} = 16$; $N_{30} = 3$; $N_{35} = 0$.

A margarine was produced by emulsifying an aqueous phase (16%) with the above fat blend (84%) and by working and cooling the emulsion using a Votator ®.

The margarine obtained displayed the following hardness profile:
$C_{5°\ C.} = 970\ g/cm^2$; $C_{10°\ C.}32\ 800\ g/cm^2$;
$C_{15°\ C.} = 660\ g/cm^2$; $C_{20°\ C.} = 180\ g/cm^2$.

This margarine was presented to a panel of experts, who judged its quality in comparison with dairy butter.

The margarine did not display waxiness and had an excellent coolness. The oral response and spreadability were very similar to that of dairy butter.

EXAMPLE V

A fat blend was produced by mixing
(i) 25% of an interesterified mixture obtained by random interesterification of 70% sunflower oil and 30% palm oil, followed by hydrogenation under trans-promoting conditions (sulphur-poisoned nickel catalyst/180° C.) to a melting point of 38° C.;
(ii) 15% of palm olein (prepared as described in Example IV); and
(iii) 60% of a randomly interesterified mixture of 30% palm oil and 70% soybean oil.

The main characteristics of the total fat blend were:
$S_3 = 2\%$
$S_2E = 5\%$
$SE_2 = 6\%$
$S_2U = 20\%$
Ratio SUS:SSU = 1.2.

The fat solids profile of the fat blend was (measured by NMR):
$N_{10} = 36$; $N_{20} = 16$; $N_{30} = 4$; $N_{35} = 0$.

A margarine produced from the above fat blend according to the procedure described in Example I displayed the following hardness profile:
$C_{5°\ C.} = 1000\ g/cm^2$; $C_{10°\ C.} = 650\ g/cm^2$;
$C_{15°\ C.} = 320\ g/cm^2$; $C_{20°\ C.} = 70\ g/cm^2$.

This margarine was presented to a panel of experts, who judged its quality in comparison with dairy butter.

The margarine did not display waxiness and had an excellent coolness. The oral response and spreadability were very similar to those of dairy butter.

EXAMPLE VI

A fat blend was produced by mixing
(i) 20% of a palm olein produced as described in Example IV and hydrogenated under trans-promoting conditions (sulphur-poisoned nickel catalyst/180° C.);
(ii) 10% palm olein (non-hydrogenated) prepared as described in Example IV;
(iii) 60% of an interesterified mixture obtained by random interesterification of 70% soybean oil and 30% palm oil; and
(iv) 10% of an interesterified mixture obtained by random interesterification of a mixture consisting of 80% palmkernel fat (melting point 39° C.) and 20% hydrogenated palm oil (melting point 58° C.).

The main characteristics of the fat blend were as follows:
$S_3 = 2\%$
$S_2E = 3\%$
$SE_2 = 1\%$ $S_2U = 23\%$ $S_2M = 3\%$ (triglycerides from 2 fatty acids with a chain length of 16 to 18 carbon atoms and 1 fatty acid with a chain length of 12 to 14 carbon atoms)

Ratio SUS:SSU = 1.5.

The fat solids profile of the fat blend (measured by NMR) was:

$N_{10} = 33$; $N_{20} = 15$; $N_{30} = 2$; $N_{35} = 0$.

A margarine produced from the above fat blend according to the procedure of Example I, displayed the following hardness profile:

$C_{5°\,C.} = 850$ g/cm$^2$; $C_{10°\,C.} = 600$ g/cm2;
$C_{20°\,C.} = 105$ g/cm$^2$.

This margarine was presented to a panel of experts, who judged its quality in comparison with dairy butter.

The margarine did not display waxiness and had an excellent coolness. The oral response and spreadability were very similar to those of dairy butter.

EXAMPLES VII–XII

Reduced-fat spreads were produced by emulsifying an aqueous phase in a fat phase containing the fat blends of Examples I–VI.

The composition of the emulsion was as follows:

|  | % by weight |
| --- | --- |
| Water | 51.3 |
| Butter serum | 5.0 |
| Sodium tripolyphosphate | 0.2 |
| Potassium chloride | 0.3 |
| Lactic acid | 0.1 |
| Carrageenan | 0.9 |
| Locust bean gum | 0.6 |
| Salt | 1.0 |
| Fat blend of Examples I–VI | 40.0 |
| Monoglyceride | 0.6 |

The reduced fat spreads obtained were presented to a panel of experts who judged their quality in comparison with dairy butter.

The spreads did not display waxiness. Both the total oral response and the spreadability were good.

We claim:

1. A process for producing a fat blend, comprising mixing appropriate proportions of
    a fat (a) comprising SE$_2$ and S$_2$E triglycerides,
    a fat (b) comprising S$_2$U triglycerides more than 60% of which consist of SUS triglycerides,
    a fat (c) comprising S$_2$U triglycerides more than 60% of which consist of SSU trigylcerides, and
    a fat (d) having a melting point below 28° C., so as to obtain a fat blend wherein:
    the level of S$_3$ triglycerides does not exceed 3%;
    the sum of the levels of S$_3$ and S$_2$E triglycerides ranges from 1 to 10%;
    the level of S$_2$U triglycerides ranges from 12 to 35%;
    the level of S$_2$M triglycerides ranges from 0 to 10%;
    the sum of the levels of S$_3$, S$_2$E, SE$_2$, S$_2$U and S$_2$M triglycerides ranges from 25 to 60%;
    the ratio of SUS to SSU triglycerides ranges from 0.6 to 2.0; and wherein
    S is saturated fatty acid having a chain length of 16 or more carbon atoms,
    E is an unsaturated fatty acid in the transconfiguration with a chin length of 16 or more carbon atoms,
    U is mono- or polyunsaturated fatty acid in the cis-configuration with a chain length of 18 or more carbon atoms, and
    M is a saturated fatty acid with 12 or 14 carbon atoms,
    SUS being a symmetrical triglyceride, and
    SSU being an asymmetrical triglyceride,
    the remainder of the triglycerides consisting of triglycerides which are liquid at 10° C., and do not substantially contribute to the structure of the blend.

2. A process according to claim 1, wherein fat (a) comprises triglycerides wherein the ratio of SSE to SEE ranges from 1/3 to 3/1.

3. A process according to claim 1, wherein fat (a) constitutes 5 to 60% of the total fat blend.

4. A process according to claim 1, wherein fat (a) contains less than 20% S$_2$U triglycerides.

5. A process according to claim 1, wherein fat (a) is obtained by random interesterification of a mixture of a liquid oil hydrogenated under conditions conductive to the formation of trans-fatty acids, and palm fat.

6. A process according to claim 1, wherein fat (a) is a palm olein fraction obtained by dry-fractionating palm fat at 24° to 38° C., to obtain a stearin which is separated from the olein which is subsequently hydrogenated under conditions conductive to a level of trans exceeding 30%.

7. A process according to claim 1, wherein component (b) is a member selected from the group consisting of a palm oil, tallow, cottonseed oil, shea fat cocoa butter, fractions of said fats or oils and mixtures of said fats or fat fractions.

8. A process according to claim 1, wherein component (b) constitutes 5–40% of the total fat blend.

9. A process according to claim 1, wherein component (c) is obtained by random interesterification of a mixture of non-hydrogenated triglycerides from saturated fatty acids with a chain length of 16 or more carbon atoms and cis-unsaturated fatty acids with a chain length of 16 or more carbon atoms, said saturated fatty acids constituting 25 to 55% of the total amount of fatty acids.

10. A process according to claim 1, wherein fat (c) is substantially free from trans-fatty acids.

11. A fat blend according to claim 1, wherein fat (d) constitutes less than 25% of the total blend.

12. A fat blend according to claim 11, wherein fat (d) consists of a lauric fat.

13. A process according to claim 1, wherein fractionated fats are used at a level not exceeding 50% of the total fat blend.

14. A process according to claim 1, wherein the fat blend ratio SUS:SSU ranges from 0.8 to 1.8.

15. A process according to claim 1, wherein the fat blend has the following fat solids profile expressed in N values measured by nuclear magnetic resonance: $N_{10°\,C.} = 25$–60%; $N_{20°\,C.} = 12$–30%; $N_{25°\,C.} = 0$–3%.

* * * * *